Figure 1:
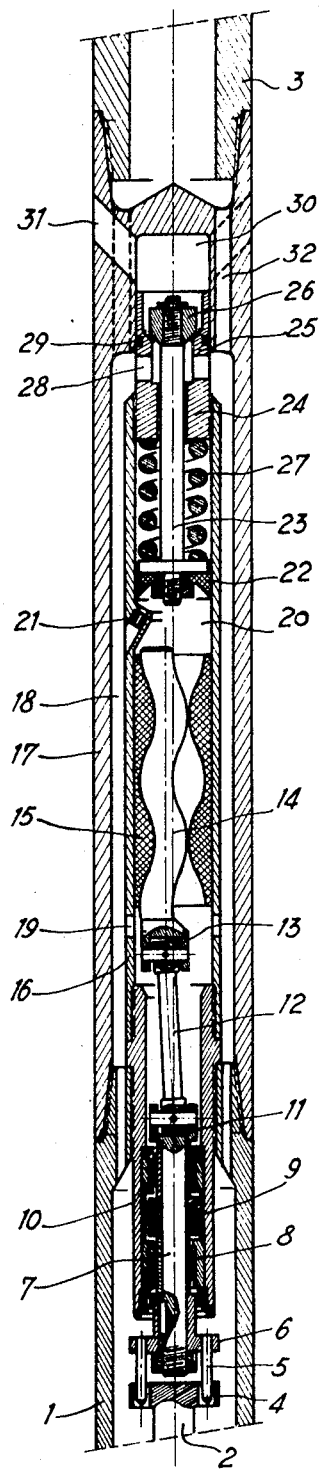

United States Patent [19]
Tiraspolsky et al.

[11] 3,749,185
[45] July 31, 1973

[54] DEVICE FOR REGULATING THE FEED FLOW OF A HYDRAULIC ROTARY MACHINE

[76] Inventors: Wladimir Tiraspolsky, 32 rue Horace Vernet, Issy-les-Moulineaux; Roger Francois Rouviere, Venelles, both of France

[22] Filed: June 7, 1972

[21] Appl. No.: 260,666

[30] Foreign Application Priority Data
June 10, 1971 France .................. 7121050

[52] U.S. Cl. .............. 175/26, 60/448, 60/459, 60/468, 173/12, 173/64
[51] Int. Cl. ........................................ E21b 3/12
[58] Field of Search .............. 417/21; 60/448, 459, 60/468; 175/107, 26; 415/36; 173/64, 12

[56] References Cited
UNITED STATES PATENTS
2,007,777  7/1935  Standerwick .................. 417/21
3,248,913  5/1966  Brundage ...................... 60/468 X

*Primary Examiner*—Al Lawrence Smith
*Assistant Examiner*—Richard Sher
*Attorney*—Irvin S. Thompson et al.

[57] ABSTRACT

This device regulates the feed rate of flow to a hydraulic rotary machine such as a volumetric motor or drilling turbine in which a valve communicating with the circuit feeding the machine with fluid is controlled as a function of the rotary speed of said machine for by-passing a part of the fluid flow from the working elements of the machine. A pump is connected to the driving shaft of the machine in order to be driven therefrom and is connected to a source of fluid in order to force fluid into a chamber having an orifice communicating with the outside. A moving member subjected to the pressure prevailing in the chamber is connected to the valve in order to control its opening in the case of an excess of pressure within the chamber, so as to control the rate of flow. This arrangement makes it possible to stabilize the rotary speed of a machine such as a drilling motor or turbine.

11 Claims, 2 Drawing Figures

Patented July 31, 1973

3,749,185

DEVICE FOR REGULATING THE FEED FLOW OF A HYDRAULIC ROTARY MACHINE

GENERAL DISCLOSURE

This invention relates in a general manner to rotary machines fed with a fluid, such as a liquid, and concerns more particularly the regulation of the feed rate of flow of such machines, in particular for stabilizing them in certain working conditions.

The growth of hydraulic control or driving machines, used as bottom equipment in drilling or boring, and more particularly that of hydraulic drilling motors, such as turbines, has been handicapped hitherto by the absence of effective means for controlling and regulating the spontaneous and sometimes random interactions between their working parameters, such as rate of flow, pressure, torque, rotatory speed and power, under the effect of variations in the interaction taking place between the driven element, such as the destruction tool in the case of drilling, and the associated driving machine or motor.

One of the most pressing problems has been that of maintaining the rotatory speed of the machine in the vicinity of a predetermined value. This problem is particularly difficult in the case of drilling turbines, because the maximum speed which becomes dangerous for a roller type drill bit, for example, practically coincides with the minimum rotatory speed of the motor, these two speeds being comprised between 300 and 400 revolutions per minute. Such problems of rotatory speed regulation may also arise for various tools or other rotatory speed ranges, and in particular for limiting the runaway speeds in cases where compressible fluids are used.

Numerous solutions have already been proposed, tried or even industrially applied for bringing the rotatory speed of a drilling turbine under the control of the parameters of interaction between tool and motor. The known methods, however, generally have a retroactive or feed-back effect which limits the freedom of control of the operator. This is the case, for example, where the regulation is ensured by a pump which maintains the rotatory speed in the vicinity of a fixed value by causing the thrust on the tool to be varied by means of a jack subjected to the effect of the pump pressure, which varies in the same way as the rotatory speed.

Another known method consists in branching off part of the flow to the outside, either directly or by way of the tool, while regulating the rotatory speed by the ratio between the flow directed towards the motor and the short-circuited flow. Such distribution of the flow is generally effected by means of a valve. It has already been proposed to ensure the control of this valve mechanically, for example from a centrifugal governor, or hydraulically by putting the valve under the control of the pressure variations resulting from a speed variation and produced by turbine blades profiled for producing a pressure drop towards low rotatory speeds. These two solutions ensure stabilization of the motor, in particular the turbine, about a certain rotatory speed, but do not permit predetermination of this speed, which remains subject to the random variations of the resistant torque.

When branching off of part of the flow is not desirable or possible, regulation of the same type has been propsoed by providing, at the turbine input, a pressure accumulator, as described in French Pat. specification No. 69-21932.

Furthermore, it has also been proposed, as described in French Pat. specification No. 70-25297, to produce from the rotatory speed a regulating back-pressure upstream of the motor by means of a recycling pump.

It is an object of the invention to produce a solution to the above-mentioned problems and to provide a device of the type in which part of the feed flow of the machine or motor is branched off or withdrawn from the feed of this machine by a valve as a function of the rotatory speed, to ensure regulation of this speed by varying the volume of driving fluid reaching the machine, for example reaching the turbine blades, this device being so designed as to supply, according to this speed, a greater variation in pressure than in known arrangements, in such a manner as to make it possible to obtain a more sensitive or more precise regulation.

Another object of the invention is to provide a device whereby it is possible to predetermine at will the rotatory speed at which the working of the machine is stablised.

The invention provides a device for regulating the feed rate of flow to a hydraulic rotary machine, in particular a volumetric motor or drilling turbine, of the type in which a valve communicating with the circuit feeding the said machine with circulating or working fluid, is controlled as a function of the rotatory speed of the said machine for by-passing part of the feed flow for withdrawing it from the active elements of the machine, comprising a pump connected for its drive to the driving shaft of the rotary machine and connected to a source of fluid and forcing this fluid into a chamber, at least one orifice putting this chamber into communication with the outside, and an element subjected to the effect of the pressure prevailing in the said chamber and connected positively to the valve for controlling the opening of this valve in the case of excess pressure created in the chamber by an increase in the rotatory speed of the machine and consequently of the pump for by-passing in known manner part of the feed flow of the working fluid.

The pump provided according to the invention may be any volumetric pump or other type of pump, but a solution which appears to be particularly advantageous is to use for this purpose a pump having a helical shaft or rotor and a helical sheath; the inlet of which pump comunicates for example with the fluid feed circuit of the machine, while its outlet delivers fluid to the aforesaid chamber.

This chamber itself may be advantageously in communication with the outside, for example with the feed circuit, through a calibrated orifice, such as a calibrated nozzle, the cross section of which may be selected as a function of the desired range of rotatory speeds.

According to one possible arrangement, the chamber is partly confined by a piston or the like movable element, which is connected to the valve, and the said piston or movable element may be subjected to the effect of an element exercising a resistant force as a function of the desired rotatory speed to be regulated. This element is advantageously formed of a resilient element, such as a spring.

The valve provided in the device according to the invention may, under the effect of excess pressure, open a communication with the outside, for example with the annular space between the turbine and drill hole in the case of a drilling turbine, or it may ensure the discharge of the branch or by-pass current, for example through the hollow shaft of the machine, particularly in the case of a volumetric bottom motor or drilling turbine.

It will be appreciated that by-passing a fraction of the feed when the excess pressure in the aforesaid chamber attains a certain value, and the variation of this by-passed fraction as a function of the said excess pressure permit the rotatory speed of the machine to be kept between a fixed minimum and maximum, the variation of the torque between these two operational limits being, in addition, continuous for maintaining a desirable stability of working conditions. The modification of the force resisting the excess pressure set up in the chamber and which may be produced by changing or regulating the aforesaid resilient element enables the rotatory speed to be selected beyond which by-passing of the feed flow and consequently regulation come into play, thereby providing the possibility of predetermining the range of rotatory speeds obtained as a function of the working conditions.

Figure 2:
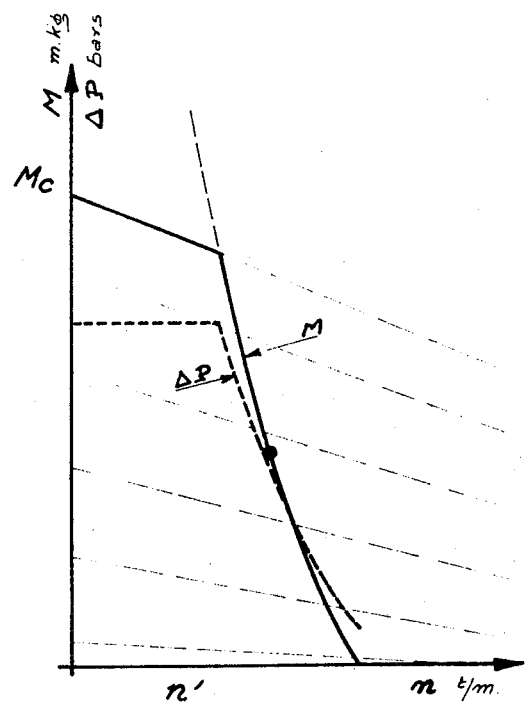

The following description, made with reference to the accompanying drawings, which are non-restrictive, will enable the invention to be better understood; in these drawings:

FIG. 1 is a sectional view of a device according to the invention, and according to a possible embodiment in the case of a drilling turbine, FIG. 2 is a graph showing the form of the curves of the drop in pressure and torque of the drilling turbine regulated by the device according to the invention for predetermined flow.

The device shown in FIG. 1 is mounted between a turbo-drill, the stator of which is denoted by reference 1 and the shaft by reference 2, and a drill string denoted by 3.

The shaft 2 of the turbine carries a head 4 connected angularly by pins 5 to the head 6 of a driving shaft 7 guided and held axially by thrust and radial bearings 8 and 9 and a sleeve 10 fixed as described later.

The driving shaft 7 is connected by a homokinetic cardan shaft 11, 12, 13 to the rotor of a volumetric pump having helical rotor and stator, the stator 15 of which is housed in a fixed sheath 16 screwed by its lower part to the sleeve 10, which is screwed to the interior of the stator 1. The sheath 16, together with the external body 17 of the device, provides an annular space 18 for the passage of the circulation fluid from the drill pipe 3 to the drilling turbine. Orifices 19 provided in the sheath 16 put the said annular space 18 into communication with the inlet of the volumetric pump 14, 15.

According to the invention, there is provided, in the interior of the sheath 16, above the volumetric pump 14, 15, a chamber 20 which communicates with the annular space 18 by means of a calibrated nozzle 21. The said chamber 20 is confined at its end opposite the pump 14, 15 by a piston 22 sliding inside the sheath 16 and carried by a rod 23 guided in a ring 24 screwed in the upper end of the sheath 16. The said ring provides a valve seat 25, with which co-operates a valve 26 carried by the rod 23. A helical spring 27, mounted between the piston 22 and ring 24, tends to hold the valve 26 on its seat 25.

Transverse ducts 28 provided in the ring 24 communicate with the annular space 18 forming the principal circuit and permit the liquid to escape from the said annular space through the open valve, as explained later. A seal 29 ensures fluid-tightness between the seat 25 and the body 17. It thus isolates from the injection current a chamber 30 provided in the body above the valve 26, the said chamber here communicating by ducts or orifices 31 with the outside, in the present case with the annular space between the body 17 of the device and the drill hole. At 32 are shown the ducts putting the drill string 3 into communication with the annular space 18 for the passage of the circulation fluid.

The mode of operation of the device according to the invention will be readily understood from a perusal of the foregoing description. The volumetric pump 14, 15 forces fluid taken from the principal circuit through the orifices 19 to the chamber 20, the said fluid being able to return to the principal circuit through the calibrated nozzle 21. When the speed of the turbodrill increases, the pump 14, 15 is driven more rapidly and produces in the chamber 20 an excess pressure which acts on the piston 22 against the force of the calibrated spring 27. Above a certain value this spring is compressed and the valve 26 is lifted off its seat 25, so that part of the circulation fluid is diverted by the ducts 28, valve 26, chamber 30 and ducts 31 to the outside, which reduces the rate of supply to the drilling turbine. In this way, regulation of the turbine speed is obtained.

It will be noted that the valve need not be fluid-tight, it being possible to maintain a slight flow of fluid.

Reference will now be made to FIG. 2, showing graphically the form of the curves of the drop in pressure and drilling turbine torque regulated by the constant supply flow device.

P denotes the regulated pressure of the pump as determined by the rotatory speed $n$, S is the cross section of the regulating piston 22. $p$ is the drop in pressure across the valve 26, $s$ is the effective cross section of this valve 26 and F is the force of the spring 27. For each axial position, we then have $$F = PS + ps.$$

It will also be noted that the valve begins to be operative, as indicated in the foregoing, only when the sum of the hydraulic thrusts exceeds the force F of the spring 27 in its condition of maximum extension in the device. The curves shown in FIG. 2 correspond to the case of a conventional symmetrical turbine.

Assuming $n'$ is the rotatory speed at which the valve 26 begins to open, there is obtained between the speed $n'$ and the stalling point a stable zone with an almost constant pressure drop, the torque following its normal curve at constant rate up to the stalling value $M_c$ of the torque.

For values higher than $n'$, the increase in the rotatory speed produces, in consequence of the opening of the valve, a reduction in the rate of flow, hence a drop in pressure and torque, the effect of which will be to brake the turbine.

For a reactive torque imparted to the tool, the rotatory speed will then be stabilised between a maximum and minimum value around the selected nominal value.

Modifications in the scope of the technical equivalents may be introduced in the embodiment described, without departing from the invention. Thus, the device described may be mounted on a turbine having a hollow shaft so as to discharge the branch flow towards the tool through the said hollow shaft, whereby it is possible to obtain an excess pressure current in the tool. It is also possible to connect the excess pressure chamber provided between the pump and calibrated nozzle to a pressure accumulator, for example a spring accumulator or any other type, acting as additional element for obtaining almost instantaneous adjustments of the supply flow. It should be noted that special features, such as the presence of turbine blades having a sloping pressure curve, or pressure-flow adjustment reactions, produced either by the capacity for resilient accumulation of the drill stem or by the reactions of the surface pumping installation, will be able to modify in magnitude or time the behaviour of the regulation, without suppressing it, possibly requiring adjustments of elements of the regulator such as, for example, the nozzle 21 or the spring 27. Yet other modifications will become apparent to persons skilled in this art.

What is claimed is:

1. Device for regulating the feed flow of the driving fluid of a hydraulic rotary machine such as a volumetric motor or a drilling turbine, having a rotary driven member such as a drilling tool and fed from a fluid source, comprising a body connected to said fluid source on the one hand and to said machine on the other hand, passages provided within said body for the fluid between said source and said machine, a valve having a valve member, provided within said body for by-passing a part of said fluid with respect to said machine, a chamber arranged within said body, orifice means provided in said chamber for putting said chamber in communication with the exterior, pump means driven from said rotary machine and forcing fluid into said chamber pressure responsive means forming a part of the wall of said chamber and subjected to the pressure of pumped fluid, and connecting means for connecting said pressure responsive means to said valve member in order to control the opening of said valve in the case of an excess of pressure created in said chamber by an increase of the speed of said rotary machine and consequently of said pump means for by-passing part of the feed flow of the driving fluid.

2. Device according to claim 1, wherein said pump means is a volumetric pump.

3. Device according to claim 1, wherein said pump means is a volumetric pump comprising a helical stator rigidly connected to said body and a helical rotor connected to said rotary machine.

4. Device according to claim 1, wherein said orifice means for putting said chamber in communication with the exterior is a nozzle.

5. Device according to claim 1, wherein said orifice means for putting said chamber in communication with the exterior is a calibrated orifice.

6. Device according to claim 1, wherein said pressure responsive means forming a part of the wall of said chamber is a piston.

7. Device according to claim 1, wherein said pressure responsive means forming a part of the wall of said chamber is a piston and comprising resilient means acting upon said piston for creating a resistant force to the opening movement of the valve.

8. Device according to claim 1, wherein said pressure responsive means forming a part of the wall of said chamber is a piston and comprising a calibrated spring acting upon said piston for creating a resistant force to the opening movement of the valve.

9. Device for regulating the feed flow of the driving fluid of a hydraulic rotary machine such as a volumetric motor or a drilling turbine having a rotary driven member and fed from a fluid source, comprising a body connected to said fluid source on the one hand and to said rotary machine on the other hand, a sheath located within said body, said sheath having such a diameter as to provide with said body an annular space for the circulation of said driving fluid of said rotary machine, a valve having a valve member provided within said sheath for by-passing a part of said fluid with respect to said machine, a chamber arranged within said sheath, orifice means provided in said chamber for putting said chamber in communication with said annular space, pump means located within said sheath, driven from said rotary machine and forcing fluid into said chamber, piston means comprising a part of the chamber wall slidably arranged within said sheath, and subjected to the pressure of the pumped fluid, and connecting means for connecting said piston means to said valve member in order to control the opening of said valve in the case of an excess of pressure created in said chamber by an increase of the speed of said rotary machine and consequently of said pump means for by-passing part of the feed flow of the driving fluid.

10. Device according to claim 9, wherein said machine is a drilling turbine and communication means are provided for connecting said valve with the annular space surrounding the turbine body within the bore hole.

11. Device according to claim 9, wherein the machine has a hollow shaft connected to a tool and said valve is in communication with the hollow cavity of said shaft in order directly to feed said tool with the by-passed fluid.

* * * * *